United States Patent [19]

Tosseghini

[11] Patent Number: 4,596,267

[45] Date of Patent: Jun. 24, 1986

[54] PISTON-DRIVEN VALVES

[75] Inventor: Hugo Tosseghini, Conflans-Ste-Honorine, France

[73] Assignee: Joucomatic S.A., Rueil-Malmaison, France

[21] Appl. No.: 689,894

[22] Filed: Jan. 9, 1985

[30] Foreign Application Priority Data

Jan. 10, 1984 [FR] France .................. 84 00259

[51] Int. Cl.⁴ .......................................... F16K 31/122
[52] U.S. Cl. ................... 137/270; 251/63.5; 92/151
[58] Field of Search .................. 92/128, 151; 137/269, 137/270; 251/63.3, 63.5, 63.6

[56] References Cited

U.S. PATENT DOCUMENTS

| | | | |
|---|---|---|---|
| 2,116,046 | 5/1958 | Schmutz | 92/151 UX |
| 2,944,520 | 7/1960 | Swanson | 92/151 X |
| 3,150,675 | 9/1964 | Phillips | 137/85 |
| 4,505,188 | 3/1985 | Weydt | 92/59 X |

Primary Examiner—Alan Cohan
Attorney, Agent, or Firm—Wenderoth, Lind & Ponack

[57] ABSTRACT

A piston-driven valve includes a valve body provided with inlet and outlet openings, the communication between which may be interrupted by a valve member which is integral with a rod connected to a piston on which a valve control pressure is exerted. The piston is located in a head mounted on the valve body and receiving a system of reset springs of the driving piston. The head includes a valve being characterized in that it includes at least one head comprising a housing with a cylindrical bore, the walls of which are provided with passages for the control fluid. The upper end of the bore is closed by a cover. The piston and its system of reset springs are reversibly mounted in the head. The head is mounted on a base which is provided with openings for the control fluid and which cooperate with the passages, so that the control pressure enters the head either under the control piston or over the control piston. Fastening devices connect the base to the valve body, and also connect the driving piston of one head with the piston rod of another head, so as to allow several identical heads to be coupled.

4 Claims, 7 Drawing Figures

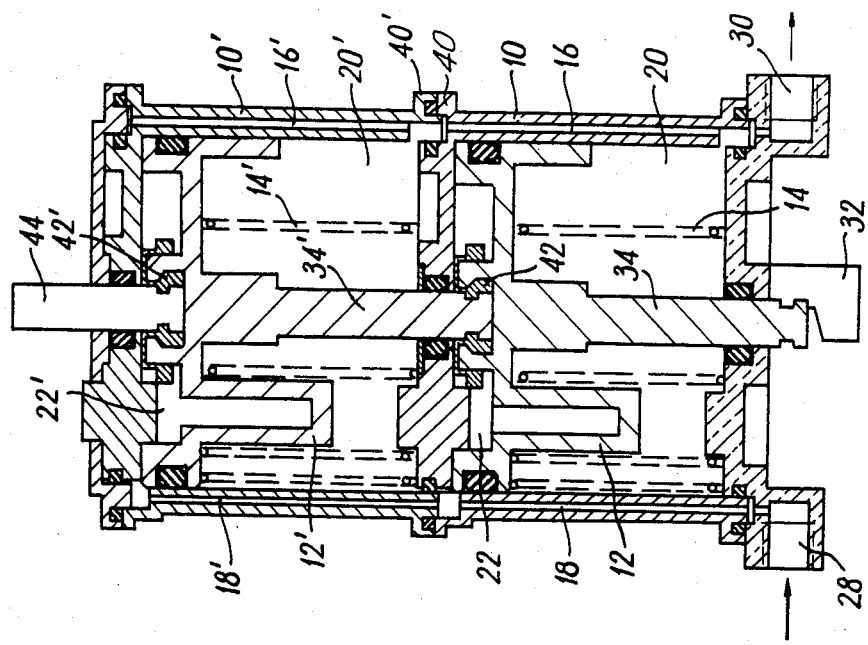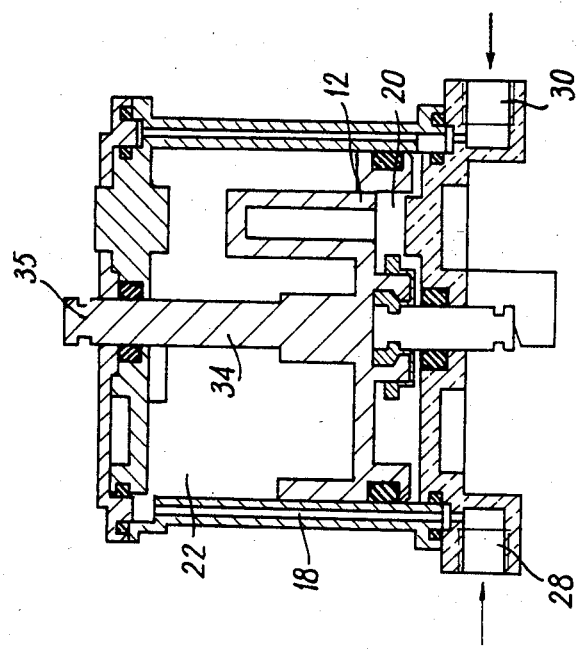

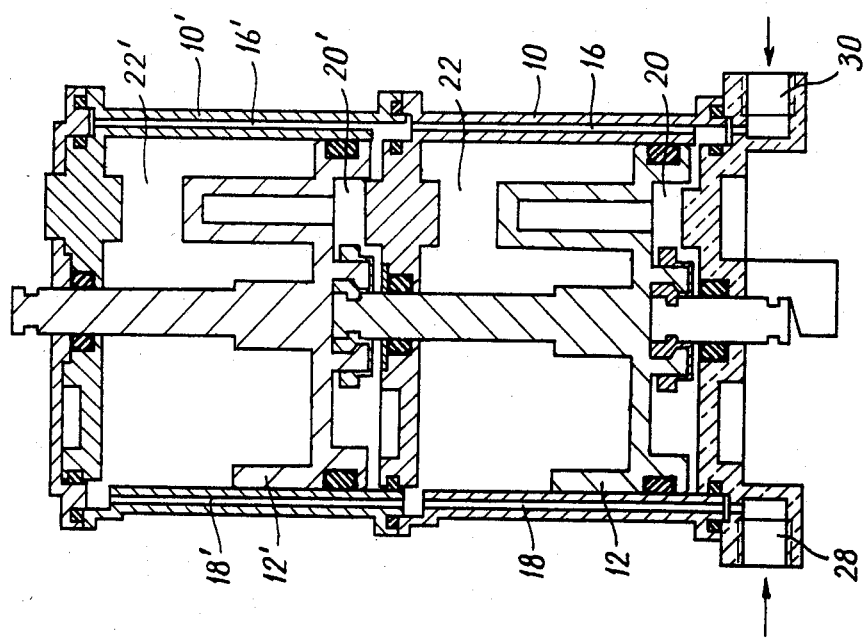
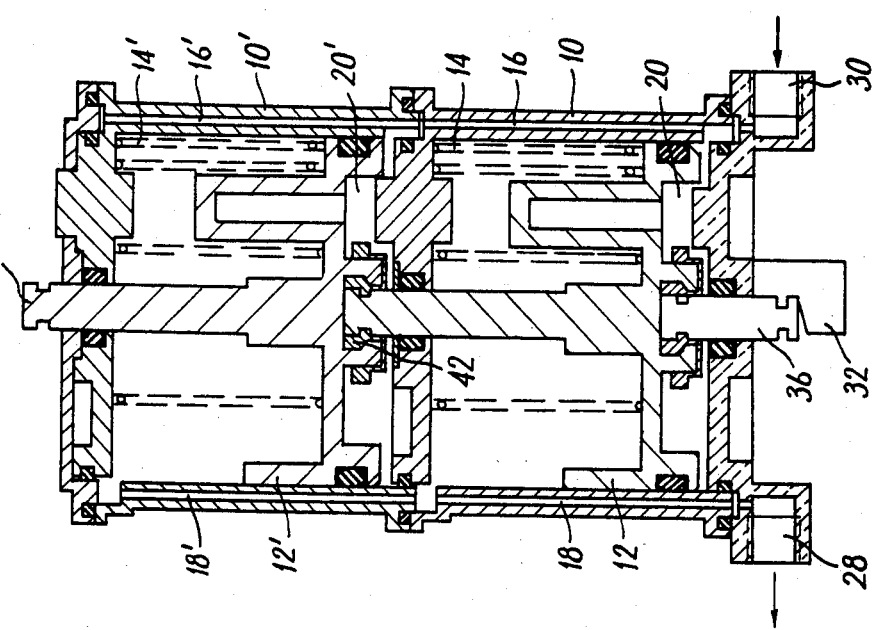

PISTON-DRIVEN VALVES

BACKGROUND OF THE INVENTION

This invention relates to improvements in piston-driven valves. Such valves units include a valve body equipped with inlet and outlet openings the communication between which may be interrupted by a valve member which is integral with a rod connected to a piston which is subjected to a valve control pressure. The piston is located in a head mounted on the valve body and including a spring system securing the resetting of the driving-piston. This well-known valve type generally comprises two main variants:

(a) "normally closed" valves, where the driving piston, when at rest, is subjected to the action of its reset spring to hold the valve member on a valve seat, so that the valve opens only when the control pressure acts;

(b) "normally open" valves, where the driving piston, when at rest, is subjected to the action of the reset spring system to hold the valve member away from the valve seat, so that the valve closes only when the control pressure acts.

On the other hand, the operator must be able to have at his disposal valves operable under a high control pressure, which requires resetting systems consisting of high power reset springs located in heads of large dimensions. The high pressure valves are dangerous to handle, especially during disassembling operations for maintenance, due to the very high strength of the driving-piston reset springs.

The operator also must have at his disposal a relatively large number of valves for the various applications contemplated, i.e., normally open valves, normally closed valves, low control pressure valves, high control pressure valves, very high control pressure valves, etc.

SUMMARY OF THE INVENTION

The object of the invention is to provide a piston-driven valve which may work according either to the normally closed mode or to the normally open mode, and at normal, high or very high control pressure values.

Thus, the invention relates to a piston-driven valve including at least one head having a housing with a cylindrical bore and the walls of which are provided with passages for a control pressure fluid, the bore being closable, at its upper end, by a tight cover. A reversibly mounted driving-piston and a system of reset springs therefor are located in the head. A base on which the head is mounted is provided with inlet openings for the control fluid cooperating with the passages, so that the control pressure fluid may enter the head, according to the choice of the operator, either under the driving-piston or over said driving-piston. A fastening system allowing the base to be fastened to a valve body, and also enables connection of a driving-piston of one head to a piston rod of another head, so that it is possible to couple plural identical heads.

The invention makes it possible to provide, with one type of head, valves which may convey high pressure fluids simply by superposing and coupling a number of identical heads, according to the pressure employed. On the other hand, since the piston is reversible and the pressure may act either on the driving-piston or under the piston, make it possible to obtain respectively a normally open or a normally closed valve, as well as a double-acting valve.

According to the invention, the coupling engagement of the driving piston of one valve head with the piston rod of another head, when several heads are superposed, is obtained by means of a collar or ring connector.

According to another characteristic of the invention, an optical indicator, mounted on the driving piston rod, provides a visual indication of the working mode of the valve.

BRIEF DESCRIPTION OF THE DRAWINGS

Other characteristics and advantages of the invention will become more readily apparent from the following description and from the accompanying drawings, which several several non-limiting embodiments, and wherein:

FIG. 3 is a view similar to FIGS. 1 and 2, showing a head according to the invention corresponding to a "double-acting" working mode;

FIG. 4 is a longitudinal section of a valve head assembly according to the invention in the case of high pressure in the valve, low control pressure and "normally open" working mode, obtained by coupling two superposed heads, according to FIG. 1;

FIG. 5 is a longitudinal section of a valve head assembly according to the invention in the case of high pressure in the valve, low control pressure and "normally closed" working mode, obtained by coupling two superposed heads, according to FIG. 2;

FIG. 6 is a longitudinal section of a valve head assembly according to the invention in the case of high pressure in the valve, low control pressure and "double-acting" working mode, obtained by coupling two superposed heads according to FIG. 3.

DETAILED DESCRIPTION OF THE INVENTION

Figure 2:
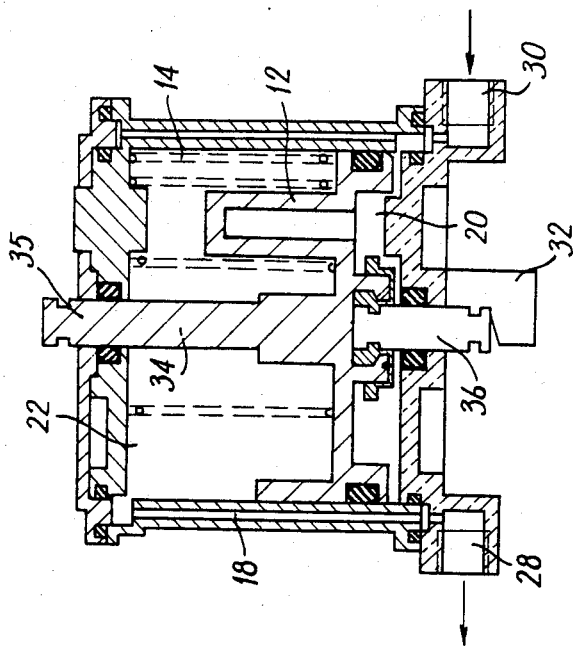
FIG. 2 is a view similar to FIG. 1, showing the valve head in a position corresponding to a "normally closed" working mode.

In FIGS. 1-6 of the drawings, only the valve heads have been represented according to the embodiments variants, because the valve body on which this head is mounted (shown only in FIG. 7) is of a conventional type. In all cases, reference may be made to the description of this valve body given in the French Pat. No. 84 00 208, filed on Jan. 9, 1984, corresponding to U.S. patent application Ser. No. 689,901, filed Jan. 9, 1985.

A valve head according to the invention includes a cylindrical part 10 in which are located a driving piston 12 and its system of reset springs 14. The walls of the head 10 have therein pipes 16, 18 which form passages for a control fluid or air, as explained hereafter. The pipe 16 opens into a chamber or room 20, which is located on one side of, i.e., under, the piston 12, and the pipe 18 opens into a chamber or room 22 which is located on the other side of, i.e., over, the piston 12. The head 10 is provided, in its upper part, with a cover 24, and is mounted at its lower part on a base 26, and the joints or seals shown in the drawings ensure tightness in a well-known manner. The base 26 is provided with openings 28, 30, which respectively cooperate with the pipes 18 and 16. On the other hand, base 26 includes a fastening system 32 for coupling with the valve body. This coupling system has been described in the above mentioned patent, to which the reader may refer. A rod 34 of the driving piston extends through the base 26, and an optical indicator 36 passes through the tight cover 24 and makes it possible to determine or check the working mode of the valve, this optical indicator having the form of a rod which has a groove into which extends a projection of a collar or a ring 38 mounted on the driving piston.

Figure 1:
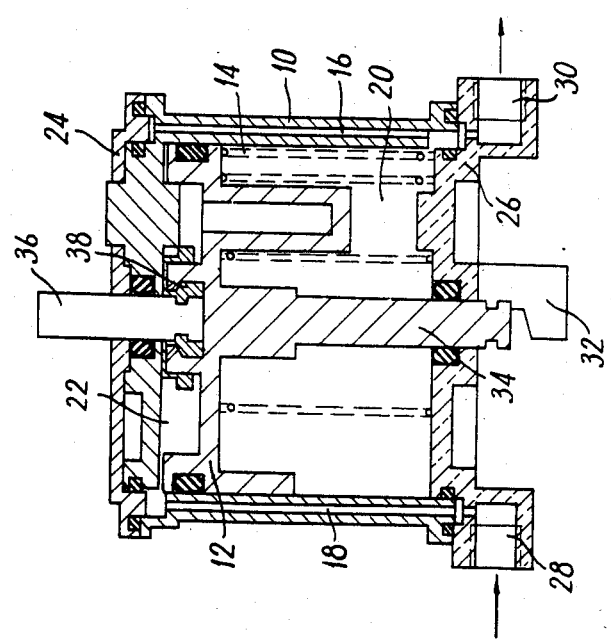
FIG. 1 is a longitudinal section of a valve head according to the invention and which is "normally open"

The following description concerns the various working or operating modes of the head according to the invention, with reference to FIGS. 1 to 3.

1. Working according to the "normally open" mode (FIG. 1):

In this working mode, the driving piston occupies the position indicated in the drawing and is maintained in such elevated position by the reset springs, such as 14. Control fluid enters through the opening 28 in the base, and then enters the room 22 after having been conveyed through the pipe 18. Under the action of the control pressure exerted in the room 22, the driving piston 12 is pushed downwards against the springs 14, so that a valve member mounted below the head is moved toward its valve seat and causes the valve to be closed. As soon as the supply of control fluid ceases, the pressure ceases in the room 22, and the springs 14 again move the piston into its elevated position, in order to open the valve. In this working mode, the opening 30 allows the air contained in the room 20 to be expelled. The optical indicator 36 provides a visual indication of the working mode of the valve.

2. Working according to the "normally closed" mode (FIG. 2):

In this working mode, the piston 12 has been turned so that its reset springs, such as 14, hold it in a lowered position in the absence of control pressure, in and thus the valve member is maintained closed on the valve seat. It will be noticed that the optical indicator 36 acts as an intermediate part for mounting the piston rod 34 on the rod of the valve (not shown), and that the upper end 35 of the piston rod acts as an optical indicator for providing a visual indication of the working mode of the valve.

The valve-control fluid is admitted through the opening 30 and enters the room 20 under the piston 12. The control pressure pushes the piston against the spring 14, thus causing the valve to open, the air contained in the room 22, over the driving piston, escaping from the head through the passage 18 and the opening 28. As soon as the supply of control pressure ceases, the action of the reset springs, such as 14, brings the piston again into its lowered position, causing the valve again to close.

3. Working according to the "double-acting" mode:

In this working mode, the positioning of the driving piston is the same as in the case of FIG. 2; however the control fluid may be admitted either into the room 20 through the opening 30, or into the room 22 through the opening 28 and the passage 18, the exhaust taking place through the opening 28 or 30 which is not used for the admission of the control fluid.

As mentioned above, the invention provides high control pressure driven valves simply by superposing and coupling a sufficient number of heads. FIGS. 4 through 6 illustrate valve head assemblies according to the invention obtained by coupling two heads, which are identical to those shown on FIGS. 1 through 3, respectively.

Referring to FIG. 4, it may be seen that the valve head assemblies is obtained by coupling two identical heads 10, 10' and making them integral with each other, for instance through connecting respective flanges 40, 40' and by coupling respective driving pistons 12, 12' by means of a collar or connector 42. Similar to connector 38 of FIG. 1. Due to this arrangement, the valve member (not shown), has a rod which extends from connected rods 34, 34', is actuated by the coupled pistons 12, 12', and the combined action of the reset springs 14, 14' allows a high control pressure working mode.

The passages 18, 18' and 16, 16' communicate with each other and emerge respectively in the openings 28 and 30 of the base 26, on which the head 10 is mounted.

The following description concerns the various working modes of a double-head valve according to the invention, with reference to FIGS. 4 through 6.

1. Working according to the "normally open" mode (FIG. 4):

In this working mode, both driving pistons 12, 12', coupled by the collar 42, are maintained in the elevated position shown by the drawing by the reset springs, such as 14, 14', so that the valve (not shown) is open in the absence of control fluid. When the control fluid is admitted through the opening 28, it enters the rooms 22, 22' through the passages 18, 18'. Under the action of the pressure exerted on the upper surfaces of the pistons 12, 12', these latter are pushed downwards against the springs 14, 14', and the valve member is moved to valve seat. During this movement of the pistons, the air contained in rooms 20, 20' escapes outwards through passages 16, 16' and from the opening 30. As soon as the supply of control fluid ceases, the springs 14, 14' bring the pistons again into their elevated positions, and therefore open the valve. The optical indicator 44, which is mounted on the rod 34' by means of a collar 42', provides a visual indication of the working mode of the valve.

2. Working according to the "normally closed" mode (FIG. 5):

In this working mode, both driving pistons 12, 12', coupled by the ring or collar 42, occupy the position shown on the drawing, i.e. an inverted position with respect to that shown in FIG. 4. As a result, the resetting action of the springs 14, 14' is exerted on the upper surface of the pistons, which are held in lowered positions, thus closing the valve (not shown) in the absence of control pressure. When the control fluid is admitted into the rooms 20, 20' through the opening 30 and the passage 16, it pushes the pistons 12, 12' against the resetting force of the springs 14, 14', thus causing lifting of the valve member and opening of the valve, the air escaping through the passages 18, 18' and the opening 28. The upper end 35' of the piston rod 12' acts as an optical indicator, thus providing a visual indication of the working mode of the valve. As soon as supply of control pressure ceases, the action of the reset springs brings the driving-pistons again into the positions shown in the drawing, and the valve is closed.

Figure 7:
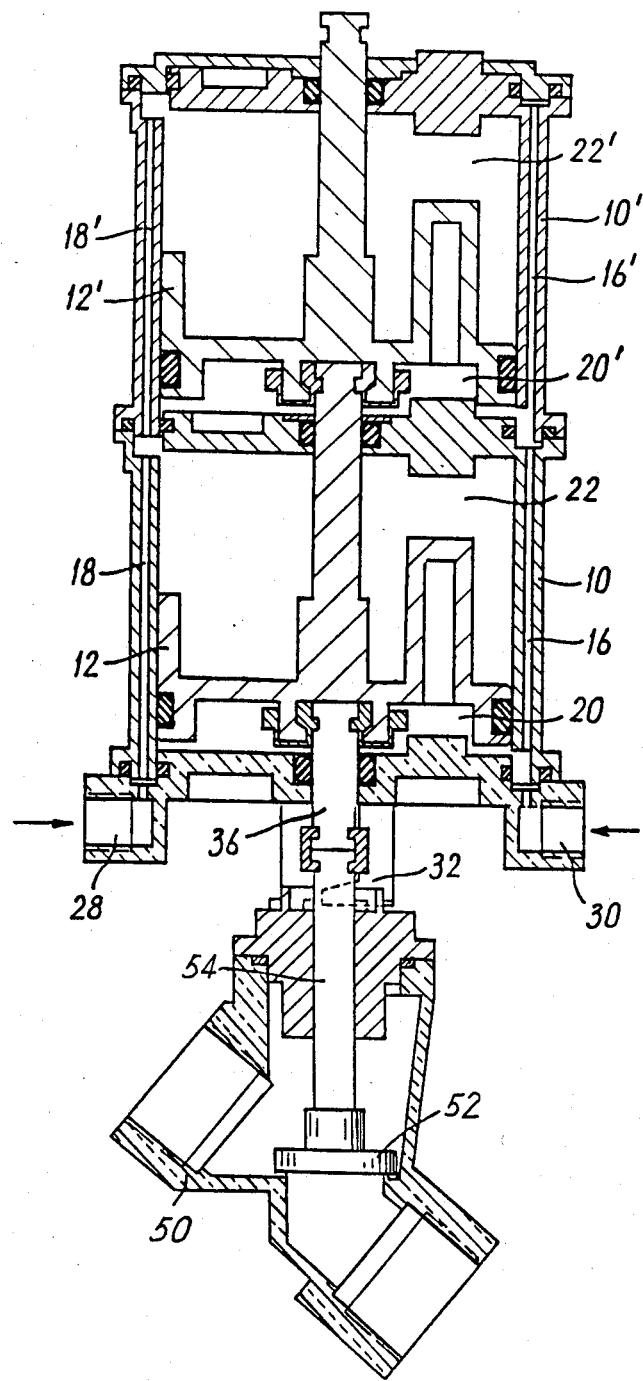
FIG. 7 is a view identical to FIG. 6, but also showing connection of the head assembly to a valve to be operated thereby.

3. Working according to the "double-acting" mode (FIG. 6):

According to this working mode, the arrangement of the coupled pistons 12, 12' is the same as in the embodiment of FIG. 5, but the control fluid may be admitted either into the rooms 20, 20', located under the pistons, or into the rooms 22, 22', over the driving pistons, by using either the opening 28 or the opening 30, the control fluid escaping through the opening 28 or 30 which is not used for the admission of the control pressure fluid. FIG. 7 shows the head assembly of FIG. 6, but also the valve operated thereby. Specifically, the valve includes a valve body 50 having an inlet and an outlet, the communication between which may be allowed or interrupted by a valve member 52 connected to a valve rod 54 connected to rod 36 by connector 32, e.g., in the manner discussed above and as disclosed in the above U.S. application.

The above description shows that the invention makes it possible to obtain, by simply coupling a well defined number of heads, amplified actions, this advantage being combined with the possibility of obtaining the various working modes which are necessary for the various applications of this type of valve.

What I claim is:

1. In a piston driven valve of the type including a valve body provided with inlet and outlet openings, communication between which may be interrupted by a valve including a valve member which is integral with a valve rod which is connected to a piston member which is subjected to a control pressure, the improvement comprising:

a plurality of identical valve heads, each said valve head comprising a housing having therethrough an axial cylindrical bore and opposite axial ends, a piston slidably mounted for movement within said bore and reversible therein, said piston partitioning the interior thereof into first and second chambers, a piston rod integral with said piston, a cover closing a first axial end of said bore, a first passage extending axially through the wall of said housing an opening into said first chamber, and a second passage extending axially through said wall of said housing an opening into said second chamber;

said plurality of valve heads being axially superposed and connected, with said piston of one said valve head being connected to said piston rod of an adjacent said valve head, thereby axially joining said pistons to define a piston unit with said first passages of said valve heads being axially connected, and with said second passages of said valve heads being axially connected;

a base mounted on an axially endmost of said valve heads;

means for connecting said base to said valve body;

means for connecting said piston of said endmost valve head to said valve rod of said valve member;

first orifice means extending through said base and connected to said first passages for selectively supplying control pressure fluid to said first chambers, and thereby move said piston unit in a first direction and move said valve member in said first direction, or for allowing discharge of air from said first chambers to enable movement of said piston unit and thereby said valve member in a second direction; and second orifice means extending through said base and connected to said second passages for selectively supplying control pressure fluid to said second chambers, and thereby move said piston unit in said second direction and move said valve member in said second direction, or for allowing discharge of air from said second chambers to enable movement of said piston unit and thereby said valve member in said first direction.

2. The improvement claimed in claim 1, wherein each said valve head further comprises spring means, reversibly mounted with the respective said piston in the respective said housing, for urging said piston in said second direction when said first orifice means operates to supply said control pressure fluid to said first chambers and for urging said piston in said first direction when said second orifice means operates to supply said control pressure fluid to said second chambers.

3. The improvement claimed in claim 1, wherein adjacent said valve heads are connected at respective flanges of said housings.

4. The improvement claimed in claim 1, further comprising a ring-shaped collar connecting said piston of one said valve head to said piston rod of an adjacent said valve head.

* * * * *